US011122013B2

(12) United States Patent
Adams et al.

(10) Patent No.: US 11,122,013 B2
(45) Date of Patent: *Sep. 14, 2021

(54) SYSTEM AND METHOD FOR ENCRYPTING DATA INTERACTIONS DELINEATED BY ZONES

(71) Applicant: Emerald Cactus Ventures, Inc., Seattle, WA (US)

(72) Inventors: Jesse Aaron Adams, Seattle, WA (US); Christopher Joseph O'Connell, Tucson, AZ (US); Jennifer Marie Catanduanes McEwen, Seattle, WA (US)

(73) Assignee: Emerald Cactus Ventures, Inc., Seattle, WA (US)

( * ) Notice: Subject to any disclaimer, the term of this patent is extended or adjusted under 35 U.S.C. 154(b) by 219 days.

This patent is subject to a terminal disclaimer.

(21) Appl. No.: 15/865,887

(22) Filed: Jan. 9, 2018

(65) Prior Publication Data

US 2018/0234394 A1  Aug. 16, 2018

Related U.S. Application Data

(60) Provisional application No. 62/459,884, filed on Feb. 16, 2017.

(51) Int. Cl.
*H04L 29/06* (2006.01)
*H04L 29/08* (2006.01)
(Continued)

(52) U.S. Cl.
CPC ........ *H04L 63/0428* (2013.01); *G06F 21/606* (2013.01); *H04L 63/0272* (2013.01);
(Continued)

(58) Field of Classification Search
CPC ............. H04L 63/0428; H04L 63/0272; H04L 63/0281; H04L 67/18; H04L 67/02; G06F 21/606; G06F 2221/2107; H04W 4/021
(Continued)

(56) References Cited

U.S. PATENT DOCUMENTS 5,778,173 A   7/1998  Apte
6,115,040 A   9/2000  Bladow et al.
(Continued)

FOREIGN PATENT DOCUMENTS

WO    2009137946 A1   11/2009

OTHER PUBLICATIONS

"Notificiation of Int'l Search Report & Written Opinion"; PCT/US18/00068; filed Feb. 16, 2018, pp. 1-8.
(Continued)

*Primary Examiner* — Shahriar Zarrineh
(74) *Attorney, Agent, or Firm* — FisherBroyles LLP; Kevin D. Jablonski

(57) ABSTRACT

A system and method for establishing zones of control for communications among computing devices. Zones of control refer to the concept of unique user-controlled silos separating the interactions between computer devices over the network. When the user of a device connects to a networked computing environment of any kind, at least some data may be sent from the user's device onto the network, as well as downloaded to the user's device. These "data interactions" are usually frequent and numerous. With a private encrypted browsing session established, communications within an established zone of control may be isolated from all other communications and vice versa.

13 Claims, 6 Drawing Sheets

(51) Int. Cl.
*G06F 21/60* (2013.01)
*H04W 4/021* (2018.01)

(52) U.S. Cl.
CPC .......... *H04L 63/0281* (2013.01); *H04L 67/18* (2013.01); *G06F 2221/2107* (2013.01); *H04L 67/02* (2013.01); *H04W 4/021* (2013.01)

(58) Field of Classification Search
USPC .......................................................... 726/1
See application file for complete search history.

(56) References Cited

U.S. PATENT DOCUMENTS

| | | | |
|---|---|---|---|
| 6,370,620 B1* | 4/2002 | Wu | G06F 16/9574 711/132 |
| 6,381,644 B2* | 4/2002 | Munguia | G06F 11/0709 709/225 |
| 6,748,418 B1* | 6/2004 | Yoshida | G06F 16/957 709/204 |
| 6,912,573 B2 | 6/2005 | Ohkado et al. | |
| 7,299,267 B1* | 11/2007 | Pedersen | H04L 29/08846 709/217 |
| 7,571,459 B2* | 8/2009 | Ganesh | G06F 21/53 709/226 |
| 8,250,653 B2 | 8/2012 | Wang et al. | |
| 8,266,714 B2* | 9/2012 | Wang | H04L 63/1441 726/29 |
| 8,417,892 B1* | 4/2013 | Roskind | G06F 12/0808 711/133 |
| 8,584,234 B1* | 11/2013 | Sobel | G06F 21/56 726/22 |
| 8,850,010 B1* | 9/2014 | Qureshi | H04L 41/0816 709/225 |
| 8,863,252 B1* | 10/2014 | Katzer | H04W 12/128 726/5 |
| 8,868,450 B2* | 10/2014 | Howard | G06F 21/6209 705/26.1 |
| 8,910,277 B1* | 12/2014 | Reis | G06F 9/468 726/22 |
| 8,997,187 B2 | 3/2015 | Manton | |
| 9,037,963 B1* | 5/2015 | Chandi | G06F 16/95 715/234 |
| 9,081,956 B2 | 7/2015 | Klein et al. | |
| 9,210,157 B1 | 12/2015 | Kim et al. | |
| 9,223,988 B1* | 12/2015 | Dorwin | H04L 47/801 |
| 9,225,690 B1* | 12/2015 | Fitch | H04L 63/0428 |
| 9,232,338 B1 | 1/2016 | Henry et al. | |
| 9,398,017 B1* | 7/2016 | Nizametdinov | H04L 63/10 |
| 9,560,519 B1* | 1/2017 | McCracken, Jr. | H04W 12/06 |
| 9,807,136 B1 | 10/2017 | Havemose | |
| 9,942,198 B2* | 4/2018 | Hoy | H04L 63/0272 |
| 9,964,982 B1 | 5/2018 | Nguyen et al. | |
| 10,574,721 B2 | 2/2020 | Bazzi et al. | |
| 2002/0129281 A1* | 9/2002 | Hatfalvi | H04L 63/08 726/15 |
| 2002/0165909 A1* | 11/2002 | Martin | H04L 69/329 709/203 |
| 2002/0199007 A1 | 12/2002 | Clayton et al. | |
| 2003/0217116 A1* | 11/2003 | Currans | H04L 67/2842 709/218 |
| 2004/0024815 A1 | 2/2004 | Kawase et al. | |
| 2005/0182824 A1 | 8/2005 | Cotte | |
| 2006/0031412 A1* | 2/2006 | Adams | G06F 21/6209 709/219 |
| 2006/0150247 A1* | 7/2006 | Gafken | G06F 21/6281 726/17 |
| 2006/0153122 A1* | 7/2006 | Hinman | H04L 63/10 370/328 |
| 2007/0136579 A1* | 6/2007 | Levy | H04L 63/102 713/168 |
| 2008/0082602 A1 | 4/2008 | Morikawa | |
| 2008/0215675 A1* | 9/2008 | Kaminitz | G06F 21/33 709/203 |
| 2008/0281921 A1* | 11/2008 | Hunt | H04L 67/02 709/206 |
| 2008/0288863 A1* | 11/2008 | Bohannon | G06Q 30/02 715/255 |
| 2008/0307519 A1 | 12/2008 | Curcio et al. | |
| 2008/0313648 A1* | 12/2008 | Wang | G06F 21/53 719/315 |
| 2009/0003368 A1 | 1/2009 | Brown | |
| 2009/0019361 A1* | 1/2009 | Morris | G06F 16/955 715/255 |
| 2009/0024916 A1* | 1/2009 | Burckart | G06F 16/9577 715/241 |
| 2009/0064279 A1 | 3/2009 | Ardolino | |
| 2009/0210515 A1* | 8/2009 | Fujita | H04L 67/02 709/219 |
| 2009/0240935 A1* | 9/2009 | Shukla | G06F 9/44505 713/100 |
| 2009/0300483 A1 | 12/2009 | Viet | |
| 2010/0049782 A1* | 2/2010 | Li | H04L 67/02 709/202 |
| 2010/0088344 A1 | 4/2010 | Treat et al. | |
| 2011/0030037 A1 | 2/2011 | Olshansky et al. | |
| 2011/0085667 A1 | 4/2011 | Berrios et al. | |
| 2012/0017094 A1 | 1/2012 | Tulchinsky et al. | |
| 2012/0023158 A1* | 1/2012 | Kashyap | H04L 63/0428 709/203 |
| 2012/0030732 A1 | 2/2012 | Shaty | |
| 2012/0096106 A1 | 4/2012 | Blumofe et al. | |
| 2012/0096511 A1* | 4/2012 | Plummer | H04L 67/02 726/1 |
| 2012/0143866 A1* | 6/2012 | Mameri | G06F 9/445 707/737 |
| 2012/0204286 A1 | 8/2012 | Gingera et al. | |
| 2012/0221932 A1* | 8/2012 | Gleadall | G06F 16/954 715/208 |
| 2012/0240237 A1* | 9/2012 | Kanevsky | G06F 16/957 726/26 |
| 2012/0304286 A1* | 11/2012 | Groll | G06F 21/60 726/22 |
| 2012/0317238 A1* | 12/2012 | Beard | H04L 63/10 709/219 |
| 2013/0014037 A1* | 1/2013 | Fisher | G06F 9/542 715/760 |
| 2013/0042295 A1 | 2/2013 | Kelly et al. | |
| 2013/0174228 A1* | 7/2013 | Etchegoyen | H04W 12/08 726/4 |
| 2013/0247144 A1* | 9/2013 | Marshall | G06F 21/335 726/1 |
| 2013/0311778 A1 | 11/2013 | Cherukuri et al. | |
| 2013/0340067 A1 | 12/2013 | Lindteigen | |
| 2014/0006548 A1* | 1/2014 | Tsolis | H04L 67/04 709/217 |
| 2014/0007182 A1 | 1/2014 | Qureshi et al. | |
| 2014/0013103 A1* | 1/2014 | Giladi | H04L 63/0428 713/150 |
| 2014/0032691 A1 | 1/2014 | Barton et al. | |
| 2014/0053238 A1 | 2/2014 | Brannon | |
| 2014/0074962 A1* | 3/2014 | Kano | G06F 16/9574 709/213 |
| 2014/0082140 A1* | 3/2014 | Toussaint | H04L 67/2814 709/217 |
| 2014/0090008 A1* | 3/2014 | Li | G06F 21/6263 726/1 |
| 2014/0157141 A1* | 6/2014 | Hussain | H04L 63/10 715/741 |
| 2014/0165177 A1* | 6/2014 | Alagha | H04L 63/0272 726/9 |
| 2014/0244623 A1* | 8/2014 | King | H04L 67/42 707/722 |
| 2014/0297437 A1 | 10/2014 | Natarajan | |
| 2014/0297937 A1* | 10/2014 | Thomas, III | G06F 12/126 711/103 |
| 2015/0039714 A1* | 2/2015 | Venturi | H04N 21/47217 709/213 |
| 2015/0143223 A1 | 5/2015 | Kolam et al. | |
| 2015/0150113 A1* | 5/2015 | Robb | H04L 63/0281 726/12 |

(56) References Cited

U.S. PATENT DOCUMENTS

| | | | |
|---|---|---|---|
| 2015/0324479 A1* | 11/2015 | Seidle, Jr. | H04L 67/02 715/234 |
| 2016/0077824 A1* | 3/2016 | Vishnepolsky | G06F 21/53 717/172 |
| 2016/0094560 A1* | 3/2016 | Stuntebeck | H04L 63/102 726/1 |
| 2016/0119342 A1 | 4/2016 | Kus et al. | |
| 2016/0147643 A1 | 5/2016 | Hamon | |
| 2016/0164946 A1* | 6/2016 | Bazzi | G06F 21/53 709/219 |
| 2016/0198012 A1* | 7/2016 | Fablet | H04L 67/26 709/231 |
| 2016/0286394 A1* | 9/2016 | Iyer | H04W 4/021 |
| 2016/0328485 A1* | 11/2016 | Dodonov | G06F 16/9574 |
| 2017/0034174 A1* | 2/2017 | Jagers | H04L 63/10 |
| 2017/0054620 A1* | 2/2017 | Kong | H04L 61/2007 |
| 2017/0085620 A1* | 3/2017 | Swaminathan | H04N 21/6373 |
| 2017/0118215 A1* | 4/2017 | Varadarajan | H04L 67/02 |
| 2017/0118241 A1 | 4/2017 | Call et al. | |
| 2017/0142216 A1* | 5/2017 | Hinde | H04L 67/02 |
| 2017/0161239 A1* | 6/2017 | Newton | G06Q 30/0241 |
| 2017/0168959 A1* | 6/2017 | Dodonov | G06F 16/9574 |
| 2017/0193221 A1* | 7/2017 | Liu | G06F 16/00 |
| 2017/0238040 A1 | 8/2017 | Huysegems et al. | |
| 2017/0243014 A1* | 8/2017 | Gopalakrishnan | G06F 21/606 |
| 2017/0353496 A1 | 12/2017 | Pai et al. | |
| 2018/0114014 A1* | 4/2018 | Thompson | G06F 21/53 |
| 2018/0219849 A1* | 8/2018 | Jones | H04L 67/20 |
| 2018/0234387 A1* | 8/2018 | Adams | H04L 63/0272 |
| 2018/0234396 A1* | 8/2018 | Adams | H04L 63/0428 |
| 2018/0234456 A1* | 8/2018 | Adams | H04L 63/18 |
| 2020/0084314 A1* | 3/2020 | Mahar | H04M 1/72463 |

OTHER PUBLICATIONS

International Search Report & Written Opinion dated May 7, 2018; PCT Application No. PCT/US18/00064; pp. 1-7.
International Search Report & Written Opinion dated Jun. 1, 2018; PCT Application No. PCT/US18/00063; pp. 1-8.
International Search Report & Written Opinion dated May 7, 2018; PCT Application No. PCT/US18/00067; pp. 1-7.

* cited by examiner

SYSTEM AND METHOD FOR ENCRYPTING DATA INTERACTIONS DELINEATED BY ZONES

PRIORITY CLAIM

This application claims the benefit of U.S. Provisional Application No. 62/459,884, entitled "SYSTEM AND METHOD FOR ENCRYPTING DATA INTERACTIONS DELINEATED BY ZONES," filed Feb. 16, 2016, which is incorporated by reference in its entirety herein for all purposes.

BACKGROUND

Computing devices, such as mobile phones, tablet computers, laptop computers and desktop computers, are often configured to connect to a computer network to communicate with other computing devices. Such is the case with the Internet and any proprietary internal computing network. Standards have been established that allow communications to be shared by all computing devices in a specific network and to ensure that network traffic is routed correctly. Further, public and private networks may coexist such that computing devices may communicate both within and outside of any private network using a public network, such as the Internet.

An administrator of a private communication network may control how and when outside computing devices may establish a connection as well as when internal devices may establish connections outside of private network. Even though a computing device may be physically separated from a private network, the private network may be extended through the public network in a virtual manner by requiring specific communication protocols and credentials prior to establishing the virtual private connection. Thus, a private network may be extended as a virtual private network through the Internet.

Vulnerabilities and privacy concerns abound when using an existing virtual private network. Various applications that use network communications may be given access to data caches and memory of the local computing device and unrelated applications on the client device, despite having no authorization, may access the data caches, memory or even the underlying virtual private network. Such data caches and memory may contain data and metadata that may be sensitive or private, and the virtual private network may contain sensitive or private information and resources. As a simple example, when using a search website, an individual may browse to a page offering solutions to a slightly embarrassing health issue. When the user subsequently browses to a shopping website, an advertisement may appear for the product to cure said embarrassing health issue. Advertising software (either from the shopping website itself, or distributed by a third party) is able to see a browsing history (or other tracking techniques, such as beacons) from the computing device used. There are ways to prevent this, but current solutions typically require a great amount of functionality to be disabled (e.g., cookies, handshakes, and the like), require significant user expertise, add significant user experience complexity, and still do not fully solve the problem that desired and undesired data are still flowing over the virtual private connection.

BRIEF DESCRIPTION OF THE DRAWINGS

The many attendant advantages of the claims may be more readily appreciated and understood by reference to the following detailed description along with the accompanying drawings, comprising:

DETAILED DESCRIPTION

The following discussion is presented to enable a person skilled in the art to make and use the subject matter disclosed herein. The general principles described may be applied to embodiments and applications other than those detailed above without departing from the spirit and scope of the detailed description. The present disclosure is not intended to be limited to the embodiments shown, but is to be accorded the widest scope consistent with the principles and features disclosed or suggested in this detailed description.

By way of an overview, the subject matter disclosed herein may be directed to a system and method for establishing zones of control for communications among computing devices. Zones of control refer to the concept of unique user-controlled silos separating the interactions between computer devices over the network. When the user of a device connects to a networked computing environment of any kind, at least some data may be sent from the user's device onto the network, as well as downloaded to the user's device. These "data interactions" are usually frequent and numerous. An obvious example is requesting specific data from websites (e.g., browsing to a website). Less obvious examples include history data, DNS data, GPS location data, cookies, browsing history, search history, phone records, online communications history, wireless roaming messages and much more. Absent restrictions, any data stored in a device or transiently generated on a device may be taken from the device during any networked computing session.

According to various embodiment discussed herein, a user of a browser (or any other common term for a networked computing session GUI) executing on a computing device may establish zones of restricted data interaction. For example, a first zone may be solely associated with other computers located in the United States (as determined by DNS records and the like), while a second zone may be restricted to computers associated with a specific domain (either directly, such as a web page e.g., www.mybusiness.com, or indirectly, such as a tracking beacon). In such an established and zoned interaction environment, data that may be shared in one zone will not be shared in any other zone. Thus, one may establish a virtual private network (VPN) using encrypted communications for a work session with a specific domain in the second zone without allowing any browsed website in the first zone, or any non-authorized application on the device or in the network, to gain access to data within the second zone. These and other aspects are discussed in conjunction with FIGS. 1-7 below.

Figure 1:
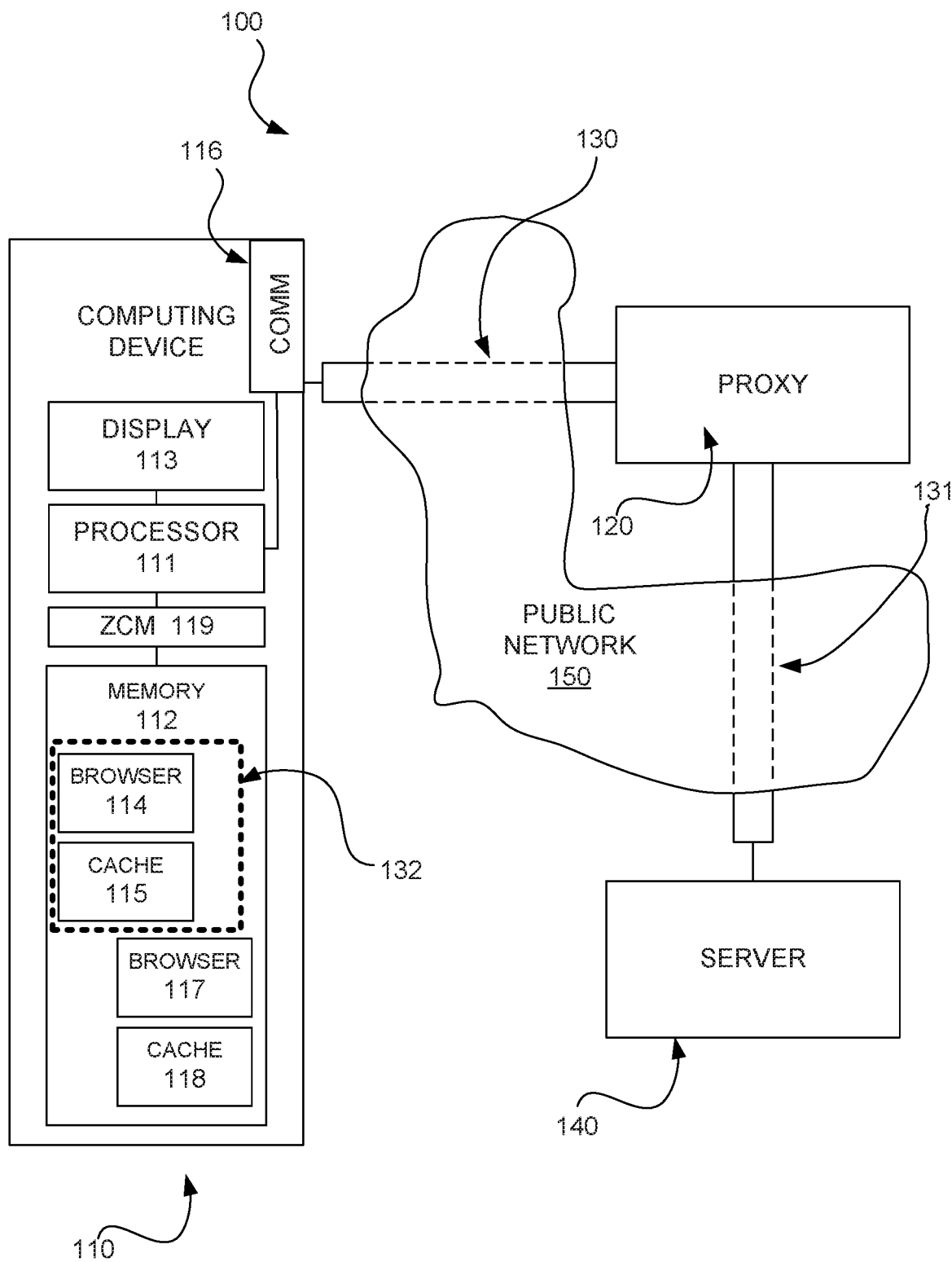
FIG. 1 is a diagram of a system for facilitating communications between a computing device and a server computer using a single zone for encrypted communications through a public network according to an embodiment of the subject disclosed herein.

FIG. 1 is a diagram of a system 100 for facilitating communications between a computing device 110 and a server computer 140 using a single zone 130 for encrypted communications through a public network 150, according to an embodiment of the subject disclosed herein. The computing device 110 may be any computing device capable of electronically communicating with a common public network 150 such as the Internet. The computing device includes a processor 111, a memory, 112, and a display 113. Further, the computing device 110 may be configured to execute an application or set of applications for facilitating communications between the computing device and any remote server computer 140 (e.g., a web server). Various applications and sets of applications may be stored in various logical delineations within the memory 112.

The computing device 110 may include several additional components, as discussed below with respect to FIG. 6. Generally, the computing device may be one or more of: a mobile computing device, a laptop computer, a tablet computing device, a desktop computer, a rack computer, a mobile phone, a personal data assistant, and the like.

Communications may be routed through one or more proxy server computers 120. In computer networks, a proxy server 120 is a server (a computer system or an application) that acts as an intermediary for requests from clients seeking resources from other servers. Clients (such as computing device 110) connect to the proxy server 120 to request some service, such as a file, connection, web page, or other resource available from a different server (such as server 140). The proxy server 120 evaluates the request as a way to simplify and control the interaction, as well as encapsulate and possibly encrypt the data channel. Today, most proxies are web proxies, facilitating access to content on the World Wide Web and providing anonymity, or VPN servers, providing encryption and security.

The computing device 110 may include a browser module 114 (sometimes called a Tenta™ Browser) or related software for web browsing (commonly referred to as a browser) formed according to one or embodiments in this disclosure. Such a browser 114 is a software application for retrieving, presenting, and traversing information resources on a public computer network, such as the Internet. An information resource may be identified by a Uniform Resource Locator (URL) and may be a web page, image, video or other piece of content. A computer language, such as Hypertext Markup Language (HTML), may be used to create web pages with hyperlinks or other navigational methods that enable users to easily access related resources using their browser software. Although browsers primarily access websites on the Internet, they can also be used to access web servers in private networks; files in file systems; data in ephemeral or secret networks, such as Tor; consensus schemes such as blockchains; or distributed schemes such as InterPlanetary File System (IPFS). The browser 114 may have a dedicated cache 115 associated only with this browser 114 realized in the overall memory space 112.

The browser 114 facilitates communication between the computing device 110 and a server computer 140 through a communication module 116 (e.g., a network interface adapter) in the computing device 110. This communication session may be encrypted through use of a virtual private network (VPN) 130. Such a connection is sometimes called a VPN tunnel, as all communications through this communication channel may be encrypted to realize greater security. The VPN 130 may include a second portion 131 that facilitates encrypted communication between a proxy server 120 and a server computer 140. In other embodiments, the communications may be unencrypted to realize the encapsulation benefits of a VPN while still providing transparency for auditing or compliance.

In the Internet addressing architecture, a private network is a network that uses private IP address space, following the standards set by RFC 1918 for Internet Protocol Version 4 (IPv4), and RFC 4193 for Internet Protocol Version 6 (IPv6). These addresses are commonly used for home, office, and enterprise local area networks (LANs). Addresses in the private space are not allocated to any specific organization and anyone may use these addresses without approval from a regional Internet registry. However, IP packets addressed from private networks generally cannot be transmitted through the public Internet. As a result, a private network can only connect to the Internet via a network address translator (NAT) gateway, a proxy server or a router.

There are good and valid reasons why it is often perilous to use addresses outside of the RFC 1918 or RFC 4193 space for a private or internal network. However, the embodiments of the systems and methods described are not restricted to private address space. Instead, any valid IP address may be encapsulated inside the VPN tunnel 130/131. There may be reasons to use such risky addresses, such as to overlay a well-known public IP with an internal version providing a similar service but with different data or privacy guarantees.

Network Address Translation (NAT) is a method of remapping one IP address space into another by modifying network address information in Internet Protocol (IP) datagram packet headers while they are in transit across a traffic routing device. The technique was originally used to ease routing traffic in IP networks without requiring every host to receive a new address. NAT has grown to become a popular and essential tool in conserving global address space allocations due to IPv4 address exhaustion. NAT shares one or a few Internet-routable IP address of a NAT gateway for an entire private network. Computers in a private network may connect to public networks and share communications using network address translation for public network communications. Even when addresses are plentiful, NAT amalgamates all of the communications from devices behind the public IP, making it difficult for other entities on the public network to distinguish between entities behind the NAT.

A VPN 130/131 is a private network that extends across a public network or the Internet 150. It enables users to send and receive data across shared or public networks as if their computing devices were directly connected to a single private network or multiple contiguous private networks. Some VPNs 130/131 allow employees to securely access a corporate intranet while located outside the office. Other VPNs 130/131 can securely connect geographically separated offices of an organization, creating one integrated network. Individual Internet 150 users can use some VPNs 130/131 to secure their transactions while on wireless networks, to circumvent geo-restrictions and censorship, and/or to connect to proxy servers 120 to protect their personal identity and location.

A VPN 130/131 is created by establishing a virtual point-to-point or point-to-multipoint connection through the use of dedicated connections, virtual tunneling protocols, or traffic encryption. A VPN 130/131 available from the public Internet 150 can provide some of the benefits of a wide area network (WAN). A VPN 130/131 user may remotely access the resources available within the private network. A VPN 130/131 facilitates encrypted, authenticated, or encrypted and authenticated communications between computing devices.

Encryption is the process of encoding messages or information so that only authorized parties can read the encrypted contents. Encryption does not prevent interception, but it denies the message content to a would-be eavesdropper. Encryption uses cryptographic algorithms to render a plaintext into a format that is not readable by those who do not possess the decryption key. It is possible to decrypt the message without the key, but unauthorized decryption requires very significant skill and large computational resources. An authorized recipient can easily decrypt the message with the key provided by the sender. An ideal cryptosystem renders the ciphertext indistinguishable from random noise. Practical cryptosystems approach this limit.

Authentication is the process of determining that the actual recipient of the message is the intended recipient. Authentication uses cryptographic algorithms to prove identity and is an important part of establishing a secure connection. Encryption by itself ensures that only the two (or more) parties exchanging messages can read the messages. Authentication ensures that the other parties are the intended recipients, rather than an attacker.

Encryption and authentication provide the strongest protections when combined together. Such combination ensures that information is readable only by the other party (or parties) and that the other party is indeed the desired sender or recipient. Combined encryption and authentication are the most common methods of using cryptography in network communications, however there are some occasions where it may be desirable to use encryption or authentication by themselves.

The combination of encryption and authentication ultimately provides four major modes of operation: (1) unencrypted, (2) encrypted but not authenticated, (3) authenticated but not encrypted, and (4) encrypted and authenticated. Further examples primarily relate to the most common encrypted and authenticated case, but nothing prevents any of these embodiments and systems from working with any of the four modes.

FIG. 1 illustrates a single computing device 110 communicating with one server computer 140 through a single VPN 130/131. This individual VPN 130/131 in FIG. 1 may be designated as a zone of control (or simply "zone"). Zones may be established and facilitated through a Zone Control Module 119. Various zones may be uniquely associated with a specific VPN. In the example of FIG. 1, zone 132 allows communications between the computing device 110 and the server computer 140 in a private encrypted manner through VPN 130/131. The encrypted zone 132 of communications may be isolated from other communications with the computing device 110. Thus, a different browsing session using a different browser 117 (and using a different associated cache 118) may use a non-encrypted, non-private communication path that is isolated from the encrypted zone 132. As a result, communications that utilize the encrypted zone 132 are cached in a memory space 115 not accessible by any other application on the computing device 110. That is, the browser 114 and associated cache 115 are mutually exclusive from the browser 117 and associated cache 118.

A user may permit use of an established zone 132 on an application-by-application basis. For example, a user may configure a cloud music player to utilize a first zone 132 configured to use any local internet connection. A user may also configure a cloud movie player to establish a second VPN using a second zone (for example a zone associated with browser 117 and cache 118) that connects to a second server (not shown in FIG. 1). Thus, setting use of zones through Zone Control Module 119 may be established by a user based upon a user-generated customized distinction among the one or more external computing devices.

Several other delineations of remote servers may be possible. One such distinction is establishing a zone of control based upon a geographic distinction among the one or more external computing devices. For example, websites that are within a user's pre-established geographic region (e.g., a United States server for a United States account), may be designated as part of an established zone of control. A further distinction may be based upon a domain-level logical delineation. For example, the computing device may be established as part of a domain, but operated remotely such that use of a banking application that only connects over a VPN to a network server operated or audited by the bank may realize domain level security.

A user may permit use of a zone 132 on a URL-by-URL basis. A user can establish a custom set of rules for various specified sites. For example, a user provides that website example.com can only be accessed through Zone 1 132. When the user opens the URL example.com/xyz, it will always perform communication in Zone 1 132. As another example, the user can prohibit the saving of any data from a particular domain in one zone 132 while allowing it in another (not shown in FIG. 1). This may be used, for instance, to view a website as a logged in user in one zone 132, while viewing it as a non-logged in user in a different zone (not shown in FIG. 1).

The use of an encrypted VPN 130/132 within a zone of control 132 may be extrapolated to several logical distinctions of communication between the computing device and other remote server computers as is discussed in the example embodiments of FIGS. 2-4 described next.

Figure 2:
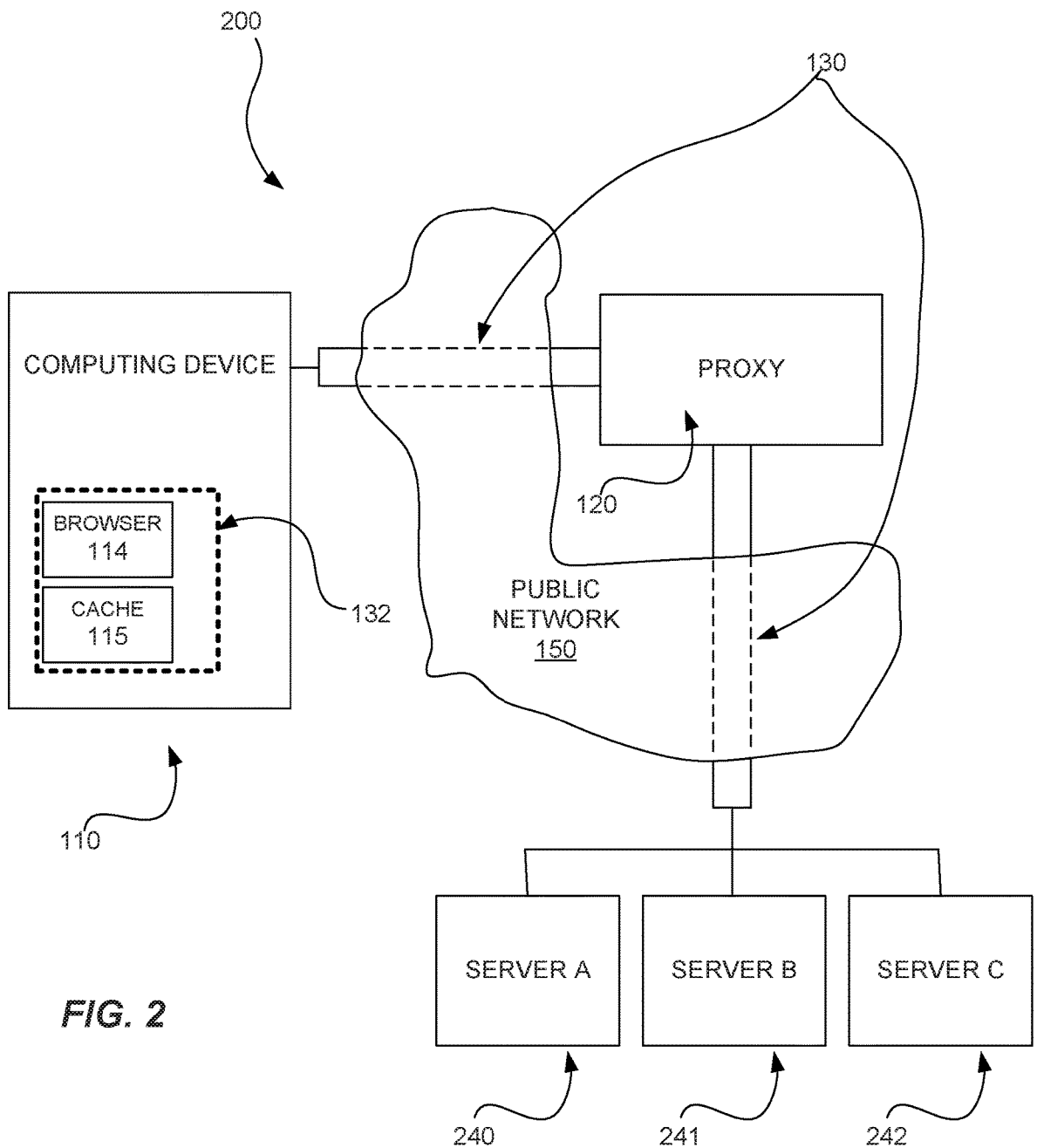
FIG. 2 is a diagram of a system for facilitating communications between a computing device and a group of server computers using a single zone for encrypted communications through a public network according to an embodiment of the subject disclosed herein.

FIG. 2 is a diagram of a system 200 for facilitating communications between a computing device 110 and a group of server computers 240, 241, and 242 using a single zone 132 for encrypted communications through a public network 150, according to an embodiment of the subject disclosed herein. It is commonly understood that a "server computer" may mean either a single physical server, or a logical grouping of physical servers. For example, multiple physical computers may be used for high availability, disaster recovery, load balancing, and the like. In all of these diagrams, server computer includes either a single physical or virtual computer, or a collection of servers operating as a single logical unit.

A user may configure the use of a zone 132 on a VPN-by-VPN basis. For example, a user establishes permission for communication based on an encrypted (but not authenticated) connection. Alternatively, a user establishes permission based on an authenticated, but not encrypted, connection. That is, the user wishes to make the contents of his communication public (as a matter of free speech, auditing, public record, and the like), but the user also wishes to ensure that the intended party may prove who sent the message. More commonly, a user establishes permission based on an encrypted and authenticated connection.

In the example of FIG. 2, the zone 132 may be established for using the VPN 130/131 to provide encrypted communication to each of the servers 240, 241, and 242. In other embodiments, however, the zone 132 may be established for using the VPN 130/131 to provide encrypted communication to at least one, but less than all, of the servers 240, 241, and 242. In the case of an excluded server (for example server 242), communications may be still occur through VPN 130/131, but communications may not be encrypted in the context of the established zone 132 and any data stored at the computing device will be stored outside of cache 115. Further still, communications to and from an excluded server (server 242 using the previous example) may also occur outside of the VPN 130/131, through a separate communication link not specifically shown in FIG. 2.

Figure 3:
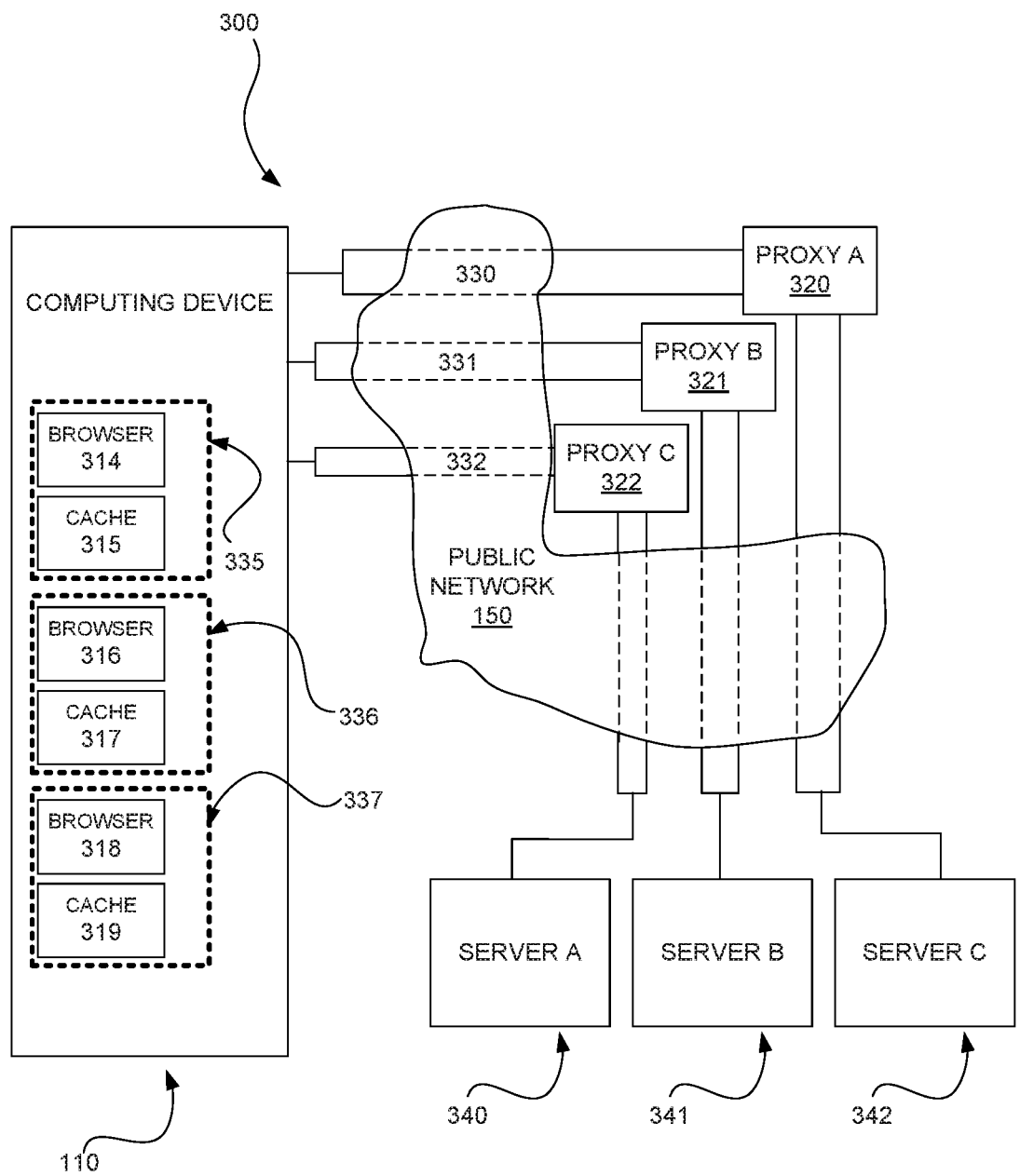
FIG. 3 is a diagram of a system for facilitating communications between a computing device and more than one server computer using more than one zone for encrypted communications through a public network according to an embodiment of the subject disclosed herein.

FIG. 3 is a diagram of a system 300 for facilitating communications between a computing device 110 and more than one server computer 340, 341, and 342, using more than one zone 335, 336, and 337 for encrypted communications through a public network 150, according to an embodiment of the subject disclosed herein. In this embodiment, a single computing device 110 may have three separate and discrete encrypted browsing VPN sessions (330, 331, and 332) via three distinct proxies (320, 321, and 322) to three different server computers (340, 341, and 342).

In this manner, a first private encrypted browsing session (with browser 314 and associated cache 315) may be established using a first zone 335 with communications through a first VPN 330 to a first server computer 340. Similarly, a second private encrypted browsing session (with browser 316 and associated cache 317) may be established using a second zone 336 with communications through a second VPN 331 to a first server computer 341. Also similarly, a third private encrypted browsing session (with browser 317 and associated cache 318) may be established using a third zone 337 with communications through a second VPN 332 to a first server computer 342. In this example, each private encrypted session may be isolated from every other private encrypted session. Further, one or more of these sessions may not be private or encrypted.

Figure 4:
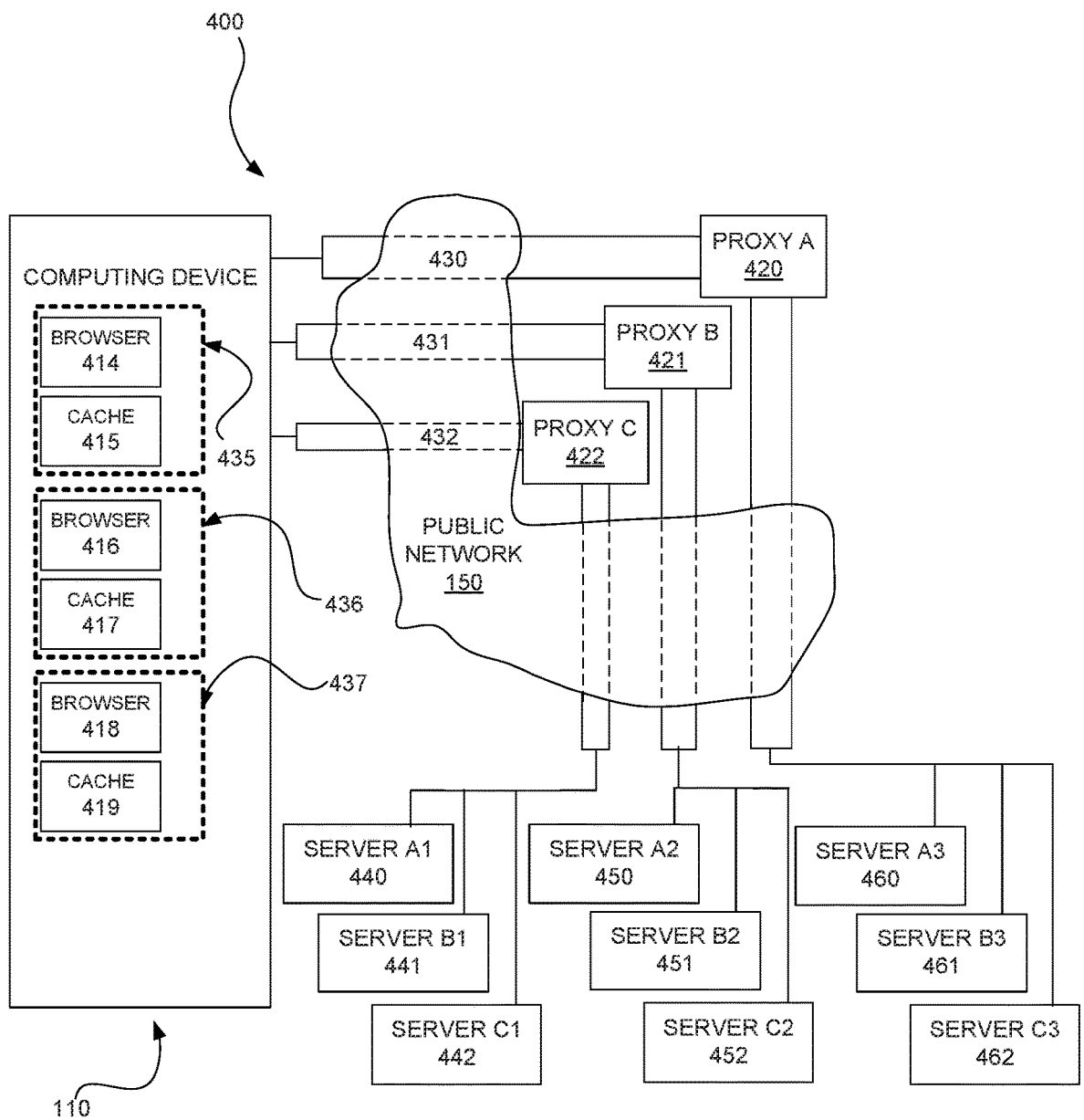
FIG. 4 is a diagram of a system for facilitating communications between a computing device and more than one group of server computers using more than one zone for encrypted communications through a public network according to an embodiment of the subject disclosed herein.

FIG. 4 is a diagram of a system 400 for facilitating communications between a computing device 110 and more than one group of server computers, using more than one zone for encrypted communications through a public network 150, according to an embodiment of the subject disclosed herein. In this embodiment, a single computing device 110 may have three separate and discrete encrypted browsing VPN sessions (430, 431, and 432) using three distinctive zones 435, 436, and 437 via three distinct proxies (420, 421, and 422) to three different groups of server computers; e.g., a first group of server computers (440A, 440B, and 440C), a second group of server computers (441A, 441B, and 441C), and a third group of server computers (442A, 442B, and 442C).

A user may permit use of a zone on a geographical-location-by-geographical location basis. For example, a user may have one zone connected to a server in Seattle and a second zone connected to a server in the UK. Each zone may then have permission rules based on the specific server location, such as only allowing certain types of files or sites to load from that zone.

A user may also permit use based on the sites to which a zone may connect. Thus, a zone connected to a server in the US might only allow US-based sites to connect. Furthermore, a company may establish a zone connected to the company's server in Seattle, then only allow access to sites whitelisted by that company, and only provide access to the company VPN server to employees of the company. More than one zone may be created and more than one set of criteria may be applied to each zone, creating a wide array of possible combinations rules and control.

Although the connections between the computing device, the proxy and the final server are shown as single encrypted links in FIG. 1-4, these links may be made of one or more links on either public or private network, and many such links may be strung together to create logical links.

Although only one proxy server is shown between the computing device and the final server in FIG. 1-4, multiple proxies may be strung together to create longer networks.

Figure 5:
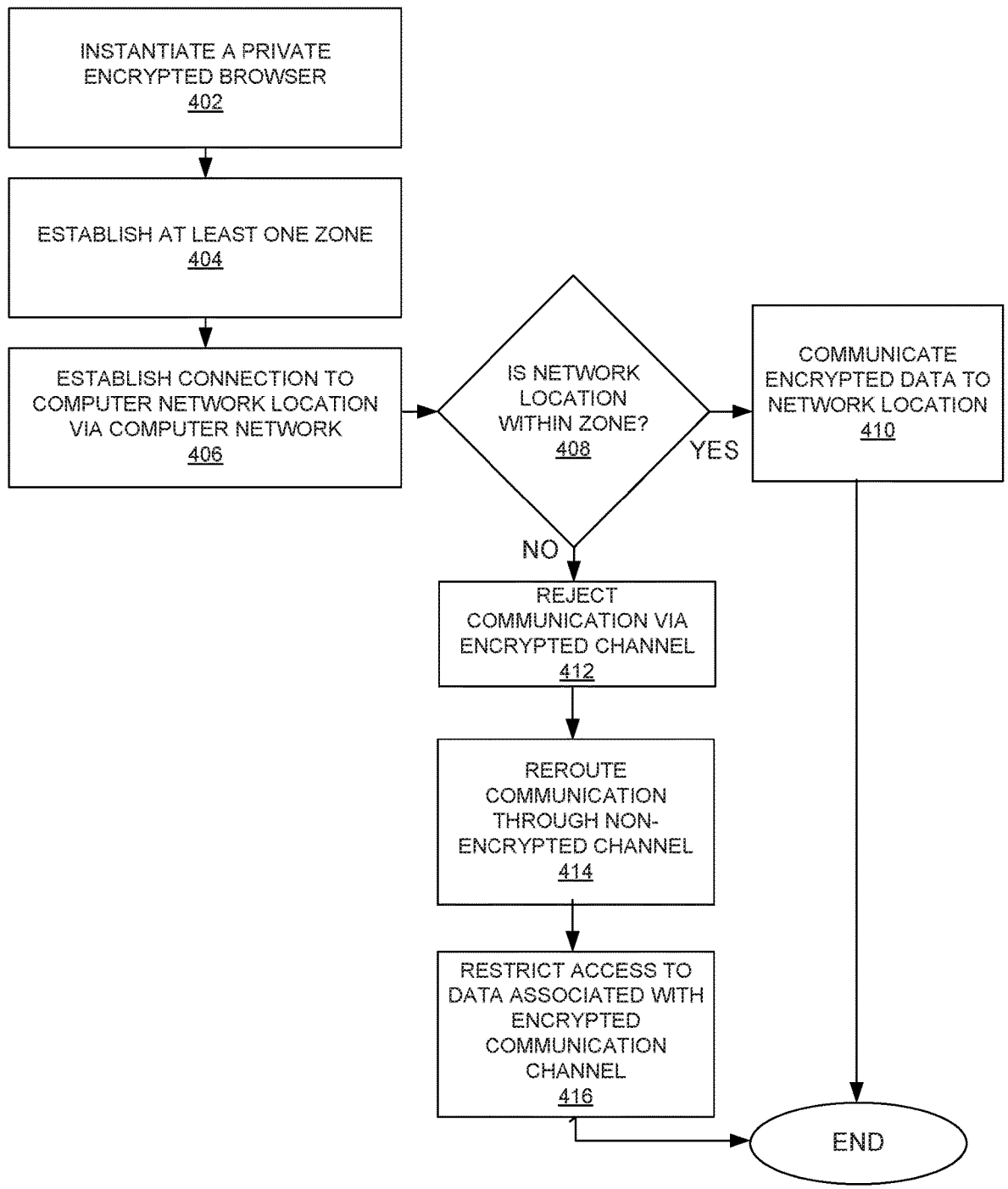
FIG. 5 is a flow diagram of a computer algorithm and method for facilitating communications between a computing device and a server computer using a single zone for encrypted communications through a public network according to an embodiment of the subject disclosed herein.

FIG. 5 is a flow diagram of a computer algorithm and method for facilitating communications between a computing device and a server computer using a single zone for encrypted communications through a public network, according to an embodiment of the subject disclosed herein. The method may begin at step 402 with the instantiation of a private encrypted browser application executing at a local computing device. The private encrypted browser may be instantiated contemporaneously with a previously executing browser that is not associated with the private encrypted communication channel.

With the private encrypted browser now executing, a user may establish a zone or select a previously established zone by which to associate with a specific private encrypted communication channel. Numerous examples above illustrate the complexity by which the zone may be established, including a zone associated with a geographic region, a domain, or a user-defined criteria. With the establishment of a zone, a dedicated cache may be established and used for data that may be received and sent using the private encrypted communication channel. The cache may be a logical partition of existing memory, a separate memory located within the computing device or an encrypted overlay of the existing memory. The cache may be transient, such as Random-Access Memory (RAM) or persistent, such as Solid-State Drive (SSD). In other embodiments, the memory may be remotely located at a proxy server. As with any encrypted communication channel, only the sender and receiver of communication are able to decrypt data that is sent through the established private encrypted communication channel.

At step 406, the computing device may engage in communicating data to and/or from at least one other computing device coupled to the local computing device through a computer network. As data is communicated, a decision step at 408 determines whether or not the communication is through the established zone and thereby part of an accepted subset of computing devices that can utilize the specifically established private encrypted communication channel associated with the established zone. If the answer to the query at step 408 is yes, then the computing device allows communication using the private encrypted channel with the remote computing device at step 410. After this, the method may end or repeat on an as needed basis.

If the answer to the query at step 408 is no, then the method moves to step 412 where the local computing device will reject the communication as being part of the private encrypted communication channel. Further, at step 414, access to data that is already part of the zone associated with the private encrypted communication channel will be restricted. Further still, the communication determined to be outside of the zone may be redirected through a communication channel other than the private encrypted communication channel associated with the zone at step 416. After this, the method may end or repeat on an as needed basis.

As skilled artisan understands that the method and algorithm shown in FIG. 5 may include more steps than those shown and aspects of the inventive subject matter may be accomplished with fewer than all of the steps shown in FIG. 5. Further, the steps may not necessarily be required to be accomplished in the order shown.

Figure 6:
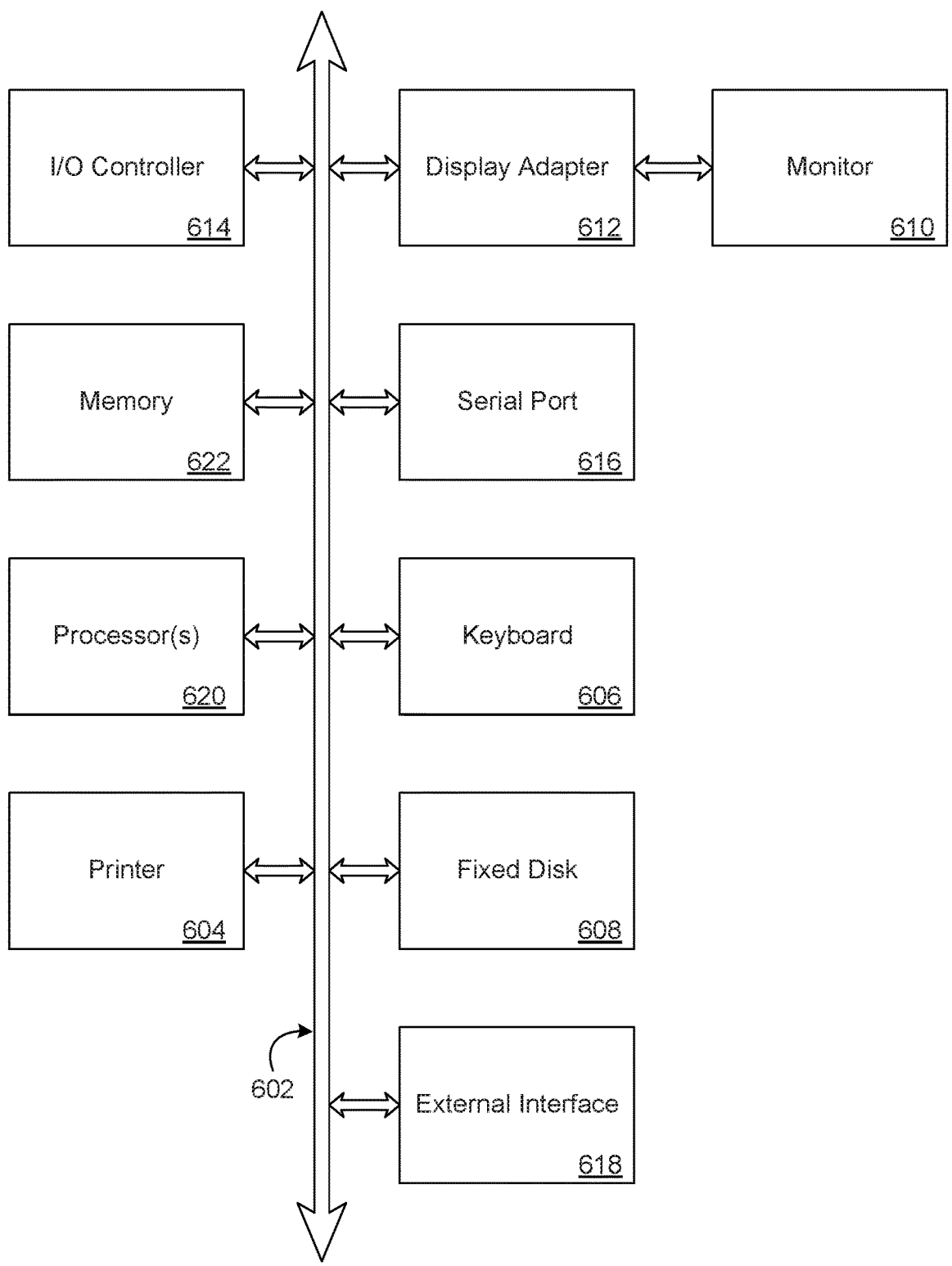
FIG. 6 is a block diagram of the computing device that is suitable for realizing the facilitation of communications depicted in FIGS. 1-4, according to an embodiment of the subject disclosed herein.

FIG. 6 is a block diagram of the computing device that is suitable for realizing the facilitations of communications depicted in FIGS. 1-4, according to an embodiment of the subject disclosed herein. FIG. 6 and the following discussion are intended to provide a brief, general description of a suitable computing environment in which the subject matter disclosed herein may be implemented. Although not required, aspects of the systems and methods described herein may occur in computer-executable instructions (such as program modules) executed by a computer device. Generally, program modules include routines, programs, objects, components, data structures, etc., that perform particular tasks or implement particular abstract data types. Such program modules may reside in a transitory and/or a non-transitory computer readable medium with computer-executable instructions. Moreover, the systems and methods disclosed herein may be applied to other computer system configurations, including hand-held devices, smart watches, cellular or mobile telephones, smart phones, tablet computing devices, multiprocessor systems, microprocessor-based or programmable consumer electronics, network personal computers, minicomputers, mainframe computers, distributed computing systems, cloud computing systems, and the like. The systems and methods disclosed may also be practiced in distributed computing environments where tasks are performed by remote processing devices that are linked through a communications network. In a distributed computing environment, program modules may be located in both local and remote computing devices.

FIG. 6 is a diagram illustrating elements or components that may be present in a computer device or system configured to implement a method, process, function, or operation in accordance with an embodiment of the information disclosed herein. It may include the system, apparatus, methods, processes, functions, and/or operations for enabling efficient configuration and presentation of a user interface to a user, based on the user's previous behavior, may be wholly or partially implemented in the form of a set of instructions executed by one or more programmed computer processors, such as a central processing unit (CPU) or microprocessor. Such processors may be incorporated in an apparatus, server, client or other computing or data processing device operated by, or in communication with, other components of the system. FIG. 6 illustrates elements or components that may be present in a computer device or system 600 configured to implement a method, process, function, or operation in accordance with an embodiment. The subsystems shown in FIG. 6 are interconnected via a system bus 602. Additional subsystems include a printer 604, a keyboard 606, a fixed disk 608, and a monitor 610, which is coupled to a display adapter 612. Peripherals and input/output (I/O) devices, which couple to an I/O controller 614, can be connected to the computer system by any number of means known in the art, such as a serial port 616. For example, the serial port 616 or an external interface 618 can be utilized to connect the computer device 600 to additional devices and/or systems not shown in FIG. 6, including a wide area network (such as the Internet), a mouse input device, and/or a scanner. The interconnection via the system bus 602 allows one or more processors 620 to: communicate with each subsystem, control the execution of instructions that may be stored in a system memory 622 and/or the fixed disk 608, and to exchange information between subsystems. The system memory 622 and/or the fixed disk 608 may represent any tangible computer-readable medium.

The systems and methods disclosed can be implemented in the form of control logic using computer software in a modular or integrated manner. Based on the disclosure and information provided herein, a person of ordinary skill in the art will know and appreciate other ways and/or methods to implement the present disclosure using hardware and a combination of hardware and software.

Any of the software components, processes or functions described in this application may be implemented as software code to be executed by a processor using any suitable computer language (e.g., C, Go, Rust, Python, PHP, and the like) and any conventional, object-oriented, or other techniques. The software code may be stored as a series of instructions or commands on: a computer readable medium, such as a random access memory (RAM), or a read only memory (ROM); a magnetic medium, such as a hard-drive or a floppy disk; or an optical medium such as a CD-ROM. Any such computer readable medium may reside on or within a single computational apparatus, and may be present on or within different pieces of computational apparatus within a system or network.

All references, including publications, patent applications, and patents, cited herein are hereby incorporated by reference to the same extent as if each reference were individually and specifically indicated to be incorporated by reference and/or were set forth in its entirety herein.

The use of the terms "a" and "an" and "the" and similar referents in the specification and in the following claims are to be construed to cover both the singular and the plural, unless otherwise indicated or clearly contradicted by context. The terms "having," "including," "containing" and similar referents in the specification and in the following claims are to be construed as open-ended terms (e.g., meaning "including, but not limited to,") unless otherwise noted. Recitation of ranges of values are merely intended to serve as a shorthand method of referring individually to each separate value inclusively falling within the range, unless otherwise indicated, and each separate value is incorporated into the specification as if it were individually recited. All methods described can be performed in any suitable order unless otherwise indicated or clearly contradicted by context. The use of any and all examples, or exemplary language (e.g., "such as") provided herein, is intended merely to better illuminate embodiments and does not pose a limitation to the scope of the disclosure unless otherwise claimed. No language in the specification should be construed as indicating any non-claimed element as essential to each embodiment of the present disclosure.

Different arrangements of the components depicted in the drawings or described above, as well as components and steps not shown or described, are possible. Similarly, some features and sub-combinations are useful and may be employed without reference to other features and sub-combinations. Embodiments have been described for illustrative and not restrictive purposes, and alternative embodiments will become apparent to readers of this patent. Accordingly, the present subject matter is not limited to the embodiments described above or depicted in the drawings, and various embodiments and modifications can be made without departing from the scope of the claims below.

While the subject matter discussed herein is susceptible to various modifications and alternative constructions, certain illustrated embodiments thereof are shown in the drawings and have been described above in detail. It should be understood, however, that there is no intention to limit the claims to the specific forms disclosed but, on the contrary, the intention is to cover all modifications, alternative constructions, and equivalents falling within the spirit and scope of the claims.

What is claimed is:

1. A computing device, comprising:
a processor configured to execute instructions stored in a memory;
a hardware-based communication module coupled to the processor and configured to communicate with one or more external computing devices through a computer network;
a software-based browser module stored in the memory and configured to be executed by the processor and configured to establish a communication link to at least one of the one or more external computing devices using the communication module;
a software-based zone control module stored in the memory configured to be executed by the processor and controlled by the browser module, the zone control module further configured to:
establish a first zone of control having permission rules based on specific server locations wherein only certain types of files or sites are allowed to load from the first zone of control, the first zone of control isolating communications coordinated by the browsing module based on a first user-generated customized criteria that identifies a first geographic region corresponding exclusively to a first physical location of at least a first one of the one or more external computing devices such that communications that originate outside of the first zone of control are restricted from accessing data generated by the communications within the first zone of control without impacting communications coordinated by the communication module; and
establish a second zone of control having permission rules based on specific server locations wherein only certain types of files or sites are allowed to load from the second zone of control, the second zone of control isolating communications coordinated by the browsing module based on second user-generated customized criteria that that identifies a second geographic region that is mutually exclusive of the first geographic region, the second geographic region corresponding exclusively to a second physical location of at least a second one of the one or more external computing devices such that communications that originate outside of the second zone of control are restricted from accessing data generated by the communications within the second zone of control without impacting communications coordinated by the communication module, the second permission rule based on the second geographic region wherein at least one file type does not have permission to be communicated to the browser module within the second zone of control;
a first cache memory exclusively associated with the first zone of control and configured to store data associated with communications within the first zone of control such that access to the first cache memory from any other communication channel outside of the first zone of control is prevented; and
a second cache memory exclusively associated with the second zone of control and configured to store data associated with communications within the second zone of control such that access to the second cache memory from any other communication channel outside of the second zone of control and communications from within the first zone of control is prevented.

2. The computing device of claim 1, wherein the communication link comprises a virtual private network communication link.

3. The computing device of claim 1, wherein the communication link comprises an encrypted communication link.

4. The computing device of claim 1, wherein at least one of the one or more external computing devices comprises a proxy server that is software-based or hardware-based.

5. The computing device of claim 1, wherein the computer network comprises a private intranet.

6. The computing device of claim 1, wherein the first criteria further comprise a first domain-level distinction among the one or more external computing devices and the second criteria further comprise a second domain-level distinction among the one or more external computing devices.

7. The computing device of claim 1, further comprising a third zone of control that allows communications with a set of external computing devices that is mutually exclusive with respect to external computing devices associated with the first zone of control and mutually exclusive with respect to external computing devices associated with the second zone of control.

8. A computing system, comprising:
a first remote computing device configured to communicate data through a computer network,
the first remote computing device physically located in a first geographic region;
a second remote computing device configured to communicate data through the computer network, the second remote computing device physically located in a second geographic region;
a local computing device configured to communicate with the first remote computing device and the second remote computing device through the computer network, the local computing device further comprising:
a processor configured to execute instructions stored in a memory;
a hardware-based communication module coupled to the processor and configured to facilitate communications associated with the local computing device through the computer network;
a software-based browser module stored in the memory and configured to be executed by the processor and configured to establish a communication link to the first remote computing device and the second remote computing device using the communication module; and
a software-based zone control module stored in the memory and configured to be executed by the processor and controlled by the browser module, the zone control module further configured to:
establish a first zone of control having permission rules based on specific server locations wherein only certain types of files or sites are allowed to load from the first zone of control, the first zone of control isolating communications coordinated by the browsing module based on a first user-generated customized criteria that that identifies the first geographic region such that communications that occur outside of the first zone of control are restricted from accessing data generated by the communications within the first zone of control without impacting communications coordinated by the communication module; and establish a second zone of control having permission rules based on specific server locations wherein only certain types of files or sites are allowed to load from the second zone of control, the second zone of control isolating communications coordinated by the browsing module based on second user-generated customized criteria that identifies the second geographic region such that communications that occur outside of the second zone of control are restricted from accessing data generated by the communications within the second zone of control without impacting communications coordinated by the communication module;

a first cache memory exclusively associated with the first zone of control and configured to store data associated with communications within the first zone of control such that access to the first cache memory from any other communication channel outside of the first zone of control is prevented; and a second cache memory exclusively associated with the second zone of control and configured to store data associated with communications within the second zone of control such that access to the second cache memory from any other communication channel outside of the second zone of control and communications from within the first zone of control is prevented.

9. The computer system of claim 8, wherein the local computing device comprises a mobile computing device.

10. The computer system of claim 8, wherein the first remote computing device comprises a server computing device.

11. The computer system of claim 8, further comprising a third remote computing device configured to communicate with the local computing device outside of the first and second zones of control.

12. The computer system of claim 8, further comprising a proxy server computing device coupled between the first remote computing device and the local computing device and within the first zone of control.

13. The computer system of claim 8, further comprising a third remote computing device that is within a third zone of control such that the third zone of control isolates communications coordinated by the browsing module that occur outside of the third zone of control and restricts other computing devices outside of the third zone of control from accessing data generated by the communications within the third zone of control without impacting communications in the first or second zones of control.

* * * * *